United States Patent [19]

Jao

[11] Patent Number: 4,780,224

[45] Date of Patent: Oct. 25, 1988

[54] METHOD OF PREPARING OVERBASED CALCIUM SULFONATES

[75] Inventor: Tze-Chi Jao, Fishkill, N.Y.

[73] Assignee: Texaco Inc., White Plains, N.Y.

[21] Appl. No.: 129,618

[22] Filed: Dec. 7, 1987

[51] Int. Cl.$^4$ .......................................... C10M 135/10
[52] U.S. Cl. ..................................... 252/25; 252/33; 252/33.4; 252/18
[58] Field of Search ................... 252/33, 33.4, 18, 25, 252/135

[56] References Cited

U.S. PATENT DOCUMENTS

| | | | |
|---|---|---|---|
| 4,427,559 | 1/1984 | Whittle | 252/33.2 |
| 4,597,880 | 7/1986 | Eliades | 252/33.4 |
| 4,604,219 | 8/1986 | Whittle | 252/33.4 |
| 4,698,170 | 10/1987 | Le Coent | 252/33.2 |

*Primary Examiner*—Jacqueline V. Howard
*Attorney, Agent, or Firm*—Jack H. Park; Kenneth R. Priem; Richard A. Morgan

[57] ABSTRACT

In an overbased sulfonate process calcium hydroxide is formed in situ by first adding 25% of the total water and then adding the remainder of the water uniformly to the calcium oxide over the entire hydration and carbonation time rather than incrementally. It has been found experimentally that by first adding at least 25% of the total water in a single aliquot that crystalline calcium carbon formation is suppressed.

A 300 TBN product is formed with an $H_2O/CaO$ molar ratio of 0.4 and a 3 hour hydration time. A 400 TBN product is formed with an $H_2O/CaO$ molar ratio of 0.8 and 3 hour hydration time.

Improved storage stability is achieved by eliminating crystalline calcium carbonate formation. Crystalline calcium carbonate has been related to engine wear.

8 Claims, No Drawings

METHOD OF PREPARING OVERBASED CALCIUM SULFONATES

BACKGROUND OF THE INVENTION

This invention is an improved method of preparing overbased calcium sulfonates which are used as detergent and reserve alkalinity lubricating oil additives.

DESCRIPTION OF THE PRIOR ART

In the course of operation, internal combustion engines convert lubricating oil to acidic degradation products. Those acidic degradation products attack and corrode engine parts and catalyze the formation of sludge, thereby reducing lubricity and accelerating wear of moving parts in contact with the lubricating oil.

It is desirable to add substances to the lubricating oil which neutralize acids as they are formed in the engine before they reach concentrations sufficient to cause corrosion or to catalyze the sludge reaction. Adding alkalinity agents to the detergent in motor oil for this purpose is known as overbasing. Colloidal carbonates of alkaline earth metals have been found to be well suited for this purpose. These colloidal carbonate dispersions are stabilized by oil soluble surface active agents such as sulfonates of the alkaline earth metals in which the sulfonic acid portion of the molecule has a molecular weight of preferably 450 to 600. The sulfonates are made by sulfonation of lubricating oil fractions from petroleum and by sulfonation of alkyl benzenes having the required molecular weight. Benzene alkylates with straight chain alkyl groups are especially effective.

U.S. Pat. No. 4,427,557 discloses an overbased sulfonate process in which a mixture of calcium hydroxide and calcium oxide are used. The solids content of the crude product is reduced without the use of an amine or ammonia promoter such as disclosed in U.S. Pat. No. 4,086,170 and without overbasing in stages with solvent removal, water treatment and dehydration steps after each stage as disclosed in U.S. Pat. No. 3,878,116. The patent teaches that the mole ratio of calcium hydroxide to calcium oxide is critical to produce a bright and clear, oil soluble product. However, previous attempts to prepare overbased sulfonates by in situ hydration of calcium oxide have not been totally satisfactory.

SUMMARY OF THE INVENTION

The invention is an improved process for producing an overbased calcium sulfonate. Calcium sulfonates derived from natural or synthetic feedstocks or a mixture thereof are overbased by diluting a neutral calcium sulfonate with a light hydrocarbon solvent in a molar ratio of solvent/neutral calcium sulfonate of about 15 to 30; and with a lower alkanol in a molar ratio of alkanol/calcium oxide of about 0.5 to 3.0. Then calcium oxide is mixed in a molar ratio of a calcium oxide/neutral calcium sulfonate of about 7 to 28 and the mixture heated to about 100° F. to 170° F. at 0 to 50 psig. Next, at least 25% and not more than 40% of the total water is added in a single portion. Then carbon dioxide and the remaining water are added continuously at a uniform rate over 1 to 4 hours. The final molar ratio of water/calcium oxide is 0.1 to 1.2 and molar ratio of calcium dioxide/calcium oxide is 0.6 to 0.9. The mixture is worked up and a micellar dispersion of calcium carbonate produced in the neutral calcium sulfonate.

DESCRIPTION OF THE PREFERRED EMBODIMENTS

The invention is an improvement in U.S. Pat. No. 4,604,219 issued Aug. 9, 1986, to J. R. Whittle incorporated herein by reference.

In accordance with the present invention, calcium sulfonates derived from natural or synthetic feedstocks or a mixture thereof can be overbased by introducing into a mixture comprising a neutral calcium sulfonate, a lower alcohol, a light hydrocarbon diluent carbon dioxide and water. First, at least 25% of the water is added. The remainder of the water is then added at a uniform rate over 1 to 4 hours, preferably 1 to 3 hours into the heated mixture with carbon dioxide. The total amount of water is added in a molar ratio water/calcium oxide of 0.1 to 1.2 preferably 0.4 to 0.8. It has been found that both the water rate and amount are critical. It has been discovered experimentally that an amorphous calcium carbonate containing product free of crystalline calcium carbonated is formed by first adding a minimum of 25% of the total water in a single aliquot with the remainder added continuously during carbonation rather than the entire amount charged at the beginning of the carbonation or the entire amount introduced continuously. By the present invention a highly overbased calcium sulfonate product with improved storage stability is formed with good lime utilization. When less than 25% of the total water is added in this manner, it was found experimentally that the exceptional improvement was not achieved.

The operating parameters of the present process are tabulated in Table I.

TABLE I

| Variable | Inventive Range | Preferred Range |
| --- | --- | --- |
| 1. First Portion of Water | At least 25% of Total (25% to 40%) | 25% to 30% |
| 2. Reaction Temperature | 100° to 170° F. | 130° to 150° F. |
| 3. Pressure, psig | 0 to 50 | 0 to 20 |
| 4. Mole ratio $H_2O/CaO$ | 0.1 to 1.2 | 0.4 to 0.8 |
| 5. Mole ratio $CO_2/CaO$ | 0.6 to 0.9 | 0.8 |
| 6. Hydrocarbon Solvent, wt % | 37 to 50 | 40 to 50 |
| 7. Alcohol, wt % | 4.7 to 7.2 | 4.8 to 5.8 |
| 8. Carbonation and Hydration Time, min | 60 to 240 | 60 to 180 |

Examples of useful and preferred reactants which may be employed in the practice of the invention are listed in Table II.

TABLE II

| Reactants | Example | Preferred Reactants |
| --- | --- | --- |
| 1. Calcium Oxide | | One with a total slaking time of 4.5–35 minutes and a temperature rise of 6° C. max in the first 30 sec. as measured by ASTM C-100-76a. |
| 2. Calcium Sulfonate | Neutralized sulfonic acid derived from a natural | Blends of neutralized sulfonic acids from natural |

TABLE II-continued

| Reactants | Example | Preferred Reactants |
| --- | --- | --- |
| | feedstock. Neutralized sulfonic acid derived from a synthetic feedstock. Blends of neutralized sulfonic acids from natural and synthetic feedstocks. | and synthetic feedstocks. |
| 3. Diluent Oil | 100–500 SUS (@ 40° C.) pale stock. 100–500 SUS solvent neutral oil. | 100 SUS pale stock hydrofinished |
| 4. Hydrocarbon Solvent | Straight run gasoline, dehexanized raffinate gasoline, normal or mixed hexanes, normal or mixed heptanes, benzene or toluene. | Crude heptane |
| 5. Lower alcohols | $C_1$–$C_5$ normal or branched chain alcohols. | Methanol |

The subject alkaline earth metal carbonate-overbased alkaline earth metal sulfonates, particularly calcium carbonate-overbased calcium sulfonates, are blended in any desired oil of lubricating viscosity to impart detergency and alkaline reserve properties. Such oil may also contain any of the conventional lube oil additives in an amount sufficient for their intended purposes. Generally, the product of the present process will be incorporated in such oils in an effective amount ranging from about 35 to about 80 weight percent of the oil for a concentrate and in an amount from about 0.1 to 20 weight percent based on the amount of neat oil for a lubricating oil formulation.

This invention is better shown by way of example.

EXAMPLE 1

A blend containing 32 parts by weight of a normal sulfonate, 91 parts heptane, 8 parts methanol and 18 parts calcium oxide was brought to reflux at 65° C. in a 500 ml reaction flask. One part of water was added. The mixture was refluxed for 10 minutes. $CO_2$ was then introduced into the reaction mixture at a rate of 40 ml/min. At the same time, water was added at a rate of 1.65 ml/hr. The total amount of water used was 4 parts. The addition of water was terminated 20 minutes before the completion of $CO_2$ addition. The $CO_2$ addition was stopped at 130 minutes after the $CO_2$ bubbling had started.

The filtered and solvent-stripped final product had a TBN value of 440–470. Its IR spectrum showed a symmetric band with a frequency of 865 cm ($-1$) indicating amorphous calcium carbonate and no trace of crystalline carbonate (875 cm ($-1$)) produced. The filtration rate of the crude product was about 0.3 ml/sec through a Whatman No. 1 filter paper and was about the same as the rate for samples from the regular water-addition process.

EXAMPLE 2

A blend containing 48 parts of a normal sulfonate, 78 parts heptane, 10 parts methanol and 16 parts of calcium oxide was brought to reflux at 65° C. in a 500 ml reaction flask. A 0.6 part portion of water was added. The mixture was refluxed for 10 minutes. $CO_2$ was then introduced into the reaction mixture at a rate of 40 ml/min. At the same time, water was added at a rate of 1.20 ml/hr. The total amount of water used was 2.6 parts. The addition of water was terminated 15 minutes before the completion of $CO_2$ treatment. The $CO_2$ treatment was stopped 120 minutes after the $CO_2$ bubbling started.

The filtered and solvent-stripped final product had a TBN value of 330–360 by IR and had no trace of crystalline product formed. The filtration rate of the crude product was about 0.1 ml/sec through a Whatman No. 1 filter paper.

EXAMPLE 3

The package storage stability of products containing amorphous and crystalline calcium carbonate were compared. Though none of the test samples were made according to the instant process, laboratory testing has shown that the instant process produces an amorphous, crystalline free calcium carbonate which is similar to the amorphous calcium carbonate samples tested here.

Package Storage Stability Test Results

| Blend | Additive Package | Sulfonate Additive | State of Carbonate | Stability after 3 months @ 150° C. |
| --- | --- | --- | --- | --- |
| A | TLA-688A | TLA-674 | amorphous | no ppt. |
| B | TLA-688A | TLA-1421 | amorphous + crystalline | precipitation |
| C | TLA-2200 | TLA-414 | amorphous | no ppt. |
| D | TLA-2200 | TLA-414(WA) | amorphous + crystalline | precipitation |

TLA-688A is the additive package containing 300 TBN overbased sulfonate for API SF/CC grade (gasoline and diesel engine grade).
TLA-2200 is the additive package containing 400 TBN overbased sulfonate for API SF grade (gasoline engine grade).
TLA-674 is a 300 TBN overbased sulfonate.
TLA-1421 is a 300 TBN overbased sulfonate.
TLA-414 is a 400 TBN overbased sulfonate.
TLA-414(WA) is a 400 TBN overbased sulfonate made according to U.S. Pat. No. 4,604,219.
TBN — Total Base Number, a measure of alkalinity.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. A process for preparing an overbased oil-soluble calcium sulfonate comprising in order:
   (a) diluting a neutral calcium sulfonate with a light hydrocarbon solvent and a lower alkanol;
   (b) mixing calcium oxide with the calcium sulfonate;
   (c) heating the resulting mixture to about 100° F. to 170° F. at pressure of about 0 to 50 psig;
   (d) adding 25% to 40% of the total liquid water;

(e) introducing continuously over a time of about 60 to 240 minutes and at a uniform rate into the heated mixture gaseous carbon dioxide and liquid water in a molar ratio of water/calcium oxide of 0.1 to 1.2;
(f) adding a diluent oil;
(g) separating solids from the liquid; and
(h) stripping the solvent from the resulting liquid product.

2. The process of claim 1 wherein the molar ratio of water/calcium oxide is 0.4 to 0.8.

3. The process of claim 1 wherein the time is about 60 to 180 minutes.

4. The process of claim 1 wherein the molar ratio of calcium oxide/neutral calcium sulfonate is about 9 and the molar ratio water/calcium oxide is about 0.4.

5. The process of claim 1 wherein the molar ratio of calcium oxide/neutral calcium sulfonate is about 21.3 and the molar ratio water/calcium oxide is about 0.8.

6. A process for preparing an overbased oil-soluble calcium sulfonate comprising in order:
(a) diluting a neutral calcium sulfonate with a light hydrocarbon solvent and a lower alkanol;
(b) mixing calcium oxide with the calcium sulfonate;
(c) heating the resulting mixture to about 130° F. to 150° F. at pressure of about 0 to 20 psig;
(d) adding 25% to 30% of the total liquid water;
(e) introducing continuously over a time of about 60 to 180 minutes and at a uniform rate into the heated mixture gaseous carbon dioxide and liquid water in a molar ratio of water/calcium oxide of 0.4 to 0.8;
(f) adding a diluent oil;
(g) separating solids from the liquid; and
(h) stripping the solvent from the resulting liquid product.

7. The process of claim 6 wherein the light hydrocarbon solvent is heptane.

8. The process of claim 6 wherein the lower alkanol is methanol.

* * * * *